United States Patent [19]

Rutherford

[11] Patent Number: 4,746,426
[45] Date of Patent: May 24, 1988

[54] LIQUID-PHASE THERMAL DIFFUSION ISOTOPE SEPARATION APPARATUS AND METHOD HAVING TAPERED COLUMN

[75] Inventor: William M. Rutherford, Dayton, Ohio

[73] Assignee: The United States of America as represented by the United States Department of Energy, Washington, D.C.

[21] Appl. No.: 804,413

[22] Filed: Dec. 4, 1985

[51] Int. Cl.$^4$ ............................................. B01D 17/09
[52] U.S. Cl. ................................... 210/176; 210/197
[58] Field of Search ............... 210/775, 805, 176, 644, 210/197; 376/463

[56] References Cited

U.S. PATENT DOCUMENTS 2,850,167 9/1958 Fink ..................................... 210/176
3,003,639 10/1961 Fink .................................. 210/775 X

OTHER PUBLICATIONS

Rutherford et al., "Separation of Calcium Isotopes", Science, 1981, vol. 211, pp. 1054–1056.

Primary Examiner—John F. Terapane
Assistant Examiner—John S. Maples
Attorney, Agent, or Firm—Armand McMillan; James H. Chafin; Judson R. Hightower

[57] ABSTRACT

A thermal diffusion counterflow method and apparatus for separating isotopes in solution in which the solution is confined in a long, narrow, vertical slit which tapers from bottom to top. The variation in the width of the slit permits maintenance of a stable concentration distribution with relatively long columns, thus permitting isotopic separation superior to that obtainable in the prior art.

12 Claims, 3 Drawing Sheets

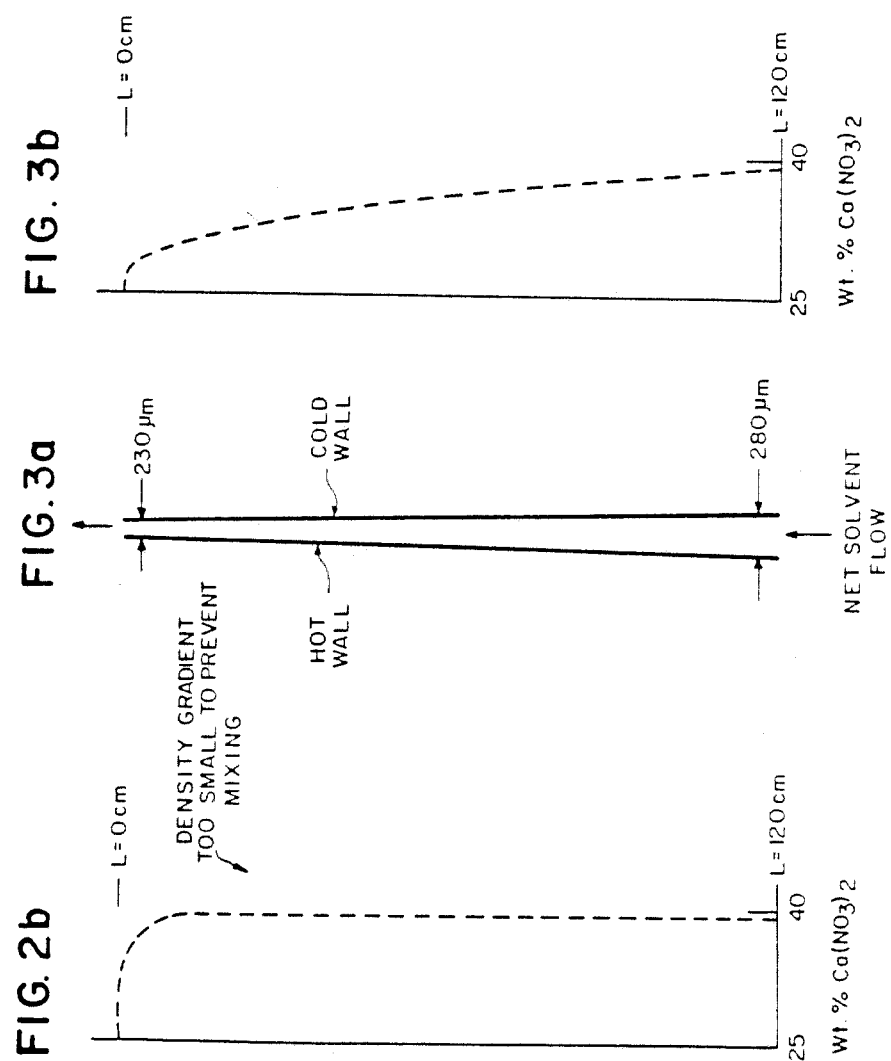

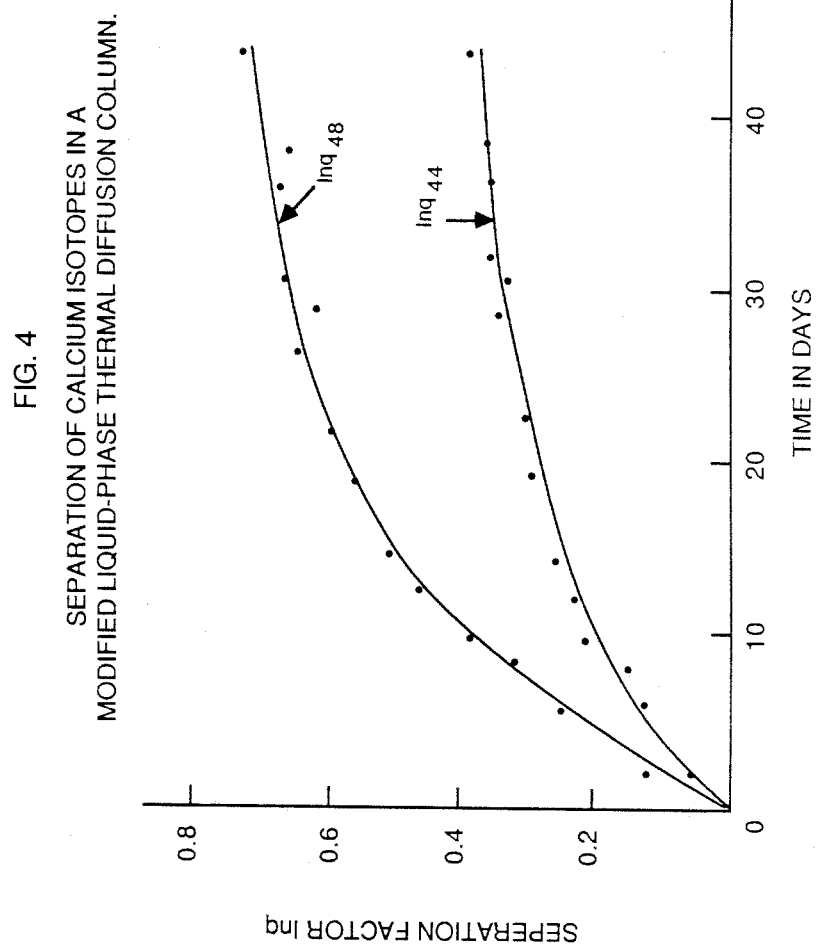

LIQUID-PHASE THERMAL DIFFUSION ISOTOPE SEPARATION APPARATUS AND METHOD HAVING TAPERED COLUMN

The U.S. Government has rights in this invention pursuant to Contract No. DE-AC04-76DP00053 between the U.S. Department of Energy and Monsanto Research Corporation.

BACKGROUND OF THE INVENTION

This invention relates to an apparatus and method for liquid-phase thermal diffusion isotope separation.

Liquid-phase thermal diffusion of isotopes in a molten single compound of the element being separated is known. This is evidenced, for example, by U.S. Pat. No. 2,968,403 to Abelson. Abelson discloses a thermal diffusion apparatus in which molten uranium hexafluoride is thermally diffused to separate $^{235}U$ from $^{238}U$. The fluid is introduced into a narrow, elongate column between two vertical walls held at substantially different temperatures (64° C. and 240° C., respectively.) The lighter isotope is first driven to the hot wall by thermal diffusion, and then up by thermal convection currents driven by the temperature gradient across the slit.

The process disclosed by Abelson is useful only for liquids which are themselves a single compound of the element whose isotopes are to be separated, such as uranium hexafluoride. The process has also been used successfully to separate practical quantities of the isotopes of sulfur, chlorine, and bromine. Many elements, however, do not form stable, low molecular weight compounds which are liquid in a temperature range suitable for thermal diffusion separation. It is possible, in principle, to separate the isotopes of such elements using solutions of one of their solid compounds dissolved in a suitable solvent. Normally, however, the separation of solute from solvent when this is attempted is much greater than the separation of isotopic species. Abelson reports, for example, that aqueous solutions of potassium bromide subjected to thermal diffusion exhibit a concentration profile having a 22-fold relative change between ends of the column. In an efficient thermal diffusion column, nearly pure solvent accumulates at one end of the system and essentially all of the solute accumulates at the other. Unless counteracted, this tendency of the solvent and solute to separate reduces yields of the isotopic separation process to the vanishing point.

The goal, then, in using thermal diffusion to separate isotopes in solution is to counter solvent separation without creating parasitic circulations which remix the separated isotopes.

For non-isotopic systems, it has been demonstrated that the solvent-solute separation can be suppressed by imposing a net counterflow of solvent through the separation column. This is disclosed in H. Korsching, "Ein abgeändertes Verfahren bei der Trennung von Lösungsbestandteilen durch Thermodiffusion in der Flüssigkeit," *Naturwissenschaften*, 32, 220 (1944) and H. Korsching, "Ein neues Verfahren bei der Trennung von gelösten Stoffen durch Thermodiffusion in der Flüssigkeit," *Zeitschrift für Naturforschung*, 7b, 187 (1952). It can be shown that, in a short column, the solvent flow does not affect the separation of the components of the solute.

Isotopic separation using a counterflow technique as described above has been attempted and reported in an article written by the present inventor and another. W. M. Rutherford and K. W. Laughlin, "Separation of Calcium Isotopes by Liquid Phase Thermal Diffusion," *Science*, 211, 1054 (1981). The separations obtained by this process, as reported in the article, were too small to be of practical use. When attempts were made to obtain larger separations in longer devices, it was found that the fluid circulation in the slit becomes unstable, resulting in extensive remixing of the isotope material. Much of the isotopic separation that might have been expected to take place was thereby destroyed.

SUMMARY OF THE INVENTION

The present invention is a counterflow process and apparatus for the separation of isotopes by liquid-phase thermal diffusion using a vertical column which tapers toward the top. Use of this tapered column permits use of counterflow with longer columns without the creation of parasitic circulation which undesirably remixes the separated isotopes. The design of the column suppresses density inversions which would otherwise restrict the practical length of the column which could be used.

BRIEF DESCRIPTION OF THE DRAWINGS

The advantages and features of the subject invention will become clear from the following description read in conjunction with the drawings, in which:

FIG. 2a and 2b are diagrams of a density profile such as might be obtained with a prior art thermal diffusion apparatus;

FIG. 3a and 3b are diagrams of a density profile such as that which can be obtained with the present invention; and FIG. 4 is a graphical representation of the progress of isotopic separation as obtained when the present invention is applied to a calcium nitrate solution.

DETAILED DESCRIPTION OF THE PREFERRED EMBODIMENTS

Figure 1:
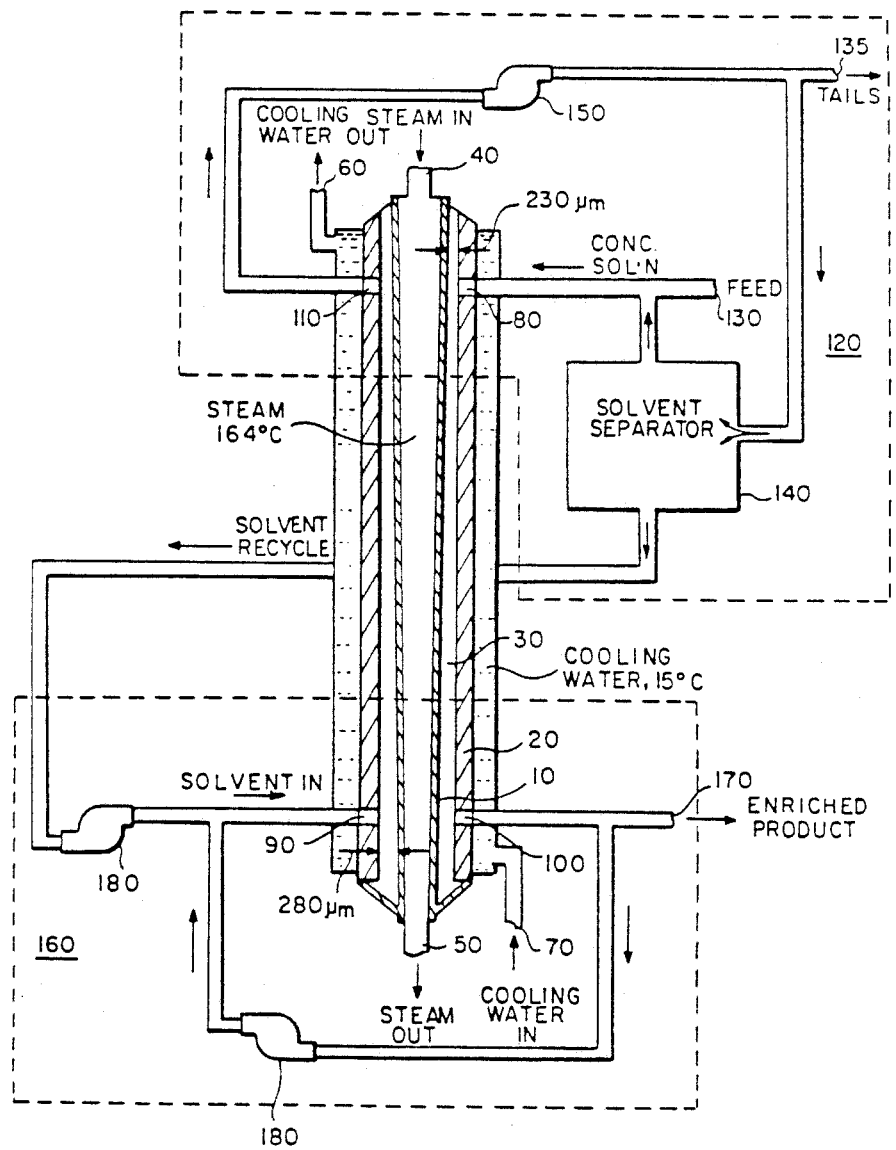
FIG. 1 is a partially schematic front elevation of a thermal diffusion apparatus according to one embodiment of the present invention.

FIG. 1 shows one embodiment of a thermal diffusion apparatus for isotopic separation according to the present invention. The apparatus comprises a first wall 10 disposed vertically and adjacent a second wall 20. In the preferred embodiment, first wall 10 is in the form of an inverted elongated frustum, and second wall 20 is in the form of an elongated cylinder disposed coaxially around first wall 10. First wall 10 and second wall 20 define therebetween a column 30 which thus tapers toward its top. It will be understood, however, that this cylindrical geometry is not a necessary feature of the invention, and that the first and second walls could also be diverging, substantially planar structures defining therebetween a slit. "Slit" as used herein includes both the flat space just described and the column, also just described. The first wall is maintained at a first temperature, while the second wall is maintained at a second temperature substantially less than the first temperature. The first and second walls are preferably made of a material having a high thermal conductivity, such as nickel 200.

It should be noted in connection with the foregoing that, although the first wall has been described as tapered and heated and the second wall as straight and cooled, it will be readily apparent to one of ordinary skill in the art that either the first or second wall may be hot or cold, respectively, and that either or both walls may be tapered, so long as they are at substantially different temperatures and diverge in the downward direction.

In the preferred embodiment, the column formed between the first and second walls is about 120 cm long, about 230 microns wide at the top, and widens monotonically to a width of about 280 microns at the bottom.

First wall 10 is heated with a heating fluid admitted at heating fluid inlet orifice 40, and exiting at heating fluid outlet orifice 50. In the preferred embodiment, this heating fluid is steam at approximately 164° C. The second wall, on the other hand, is cooled by a coolant which enters at coolant inlet orifice 70, and which exits at coolant outlet orifice 60. This coolant in the preferred embodiment is cooling water at approximately 15° C.

The solution to be subjected to thermal diffusion is introduced into slit 30 by any appropriate means, for example, through top inlet orifice 80. This solution might be, for example, an aqueous solution of calcium nitrate, if the ultimate goal were separation of the isotopes of calcium; i.e., $^{40}Ca$, $^{42}Ca$, $^{43}Ca$, $^{44}Ca$, and $^{48}Ca$.

If thermal diffusion were attempted with no measures to establish a counterflow, it would drive the heavier isotopes to the base of the column, and the lighter ones toward the top. At the same time, however, it would create a solute concentration gradient with much greater concentrations of solute at the base of the column than at the top. To overcome this effect, a net counterflow is established in the column by introducing concentrated solution at top inlet orifice 80, and solvent at bottom inlet orifice 90. "Concentrated" in this context means more concentrated than the solution originally introduced into the column. "Solvent" is used here to embrace its common meaning as well as very dilute forms of the solution originally introduced into the column. This net flow counteracts the concentration distribution, and allows isotopic separation to proceed without substantial remixing. Isotopically enriched product is available for extraction at bottom outlet orifice 100. Top outlet orifice 110 is provided for overflow of excess solution.

It is also preferable, once solution has been introduced into the column to establish recirculation loops to permit external mixing of the material being added, thereby avoiding large local density differences at the inlet ports of the column. Shown in FIG. 1 is a top recirculation loop 120, which includes top inlet orifice 80, top outlet orifice 110, a feed inlet orifice 130, a tails outlet orifice 135, and a solvent separator 140. As may be discerned from the drawing, outflow from top outlet orifice 110 is mixed with fresh feed solution, and then subjected to a separation process in solvent separator 140 which produces concentrated solution to be introduced to the top of the column through top inlet orifice 80, as well as solvent to be used in a manner described below. A pump 150 may also be provided as necessary. Tails outlet orifice 135 is used to exhaust waste solution.

The apparatus depicted in FIG. 1 is also provided with a bottom recirculation loop 160. This bottom recirculation loop includes bottom inlet orifice 90, bottom outlet orifice 100, and a product output orifice 170. Enriched product flows out of bottom outlet orifice 100, with part of this outflow capable of being diverted and mixed with the solvent from solvent separator 140. This mixture is then reintroduced into the column at bottom inlet orifice 90. As before, pumps 180 may be provided to provide the necessary pressure to maintain adequate circulation.

The theory behind the column just described is as follows. According to the theory of the solvent counterflow column, the solute concentration gradient is given by:

$$\frac{dw_2}{dz} = \frac{w_2[\sigma - H_{ss}(1 - w_2)]}{K}$$

where $w_2$ is the solute concentration, z is the height, K is the remixing coefficient, $\sigma$ is the solvent injection rate, and $H_{ss}$ is the initial transport coefficient for the solute-solvent pair. $H_{ss}$ and K are themselves functions of concentration of the solution in the column formed by the annular slit. In order to maintain a stable solute concentration gradient, it is necessary that the solvent injection rate be less than the product $H_{ss}(1-w_2)$. This keeps the gradient negative. If the solvent injection rate were to exceed the product $H_{ss}(1-w_2)$, an inverted concentration gradient would result, and hence an inverted density gradient, which would in turn result in instability and large-scale parasitic circulation. This would lead to remixing of the column contents, thereby reducing the concentration gradient to zero.

The result of this analysis is that it would be essentially impossible to obtain stable operation of a conventional thermal diffusion column (i.e., one in which the walls are everywhere equidistant from each other) much longer than 15 cm at a preferred spacing of about 254 microns.

Although $H_{ss}$ is a function of solute concentration, it is also a strong function of the hot-cold wall spacing and, in fact, increases as the cube of the spacing. The present invention exploits this fact, and uses the effective spacing to offset the effect of concentration on $H_{ss}$. Thus, by making the spacing increase toward the bottom of the column, it is possible to keep $H_{ss}$ large and hence the product $H_{ss}(1-w_2)$ larger than the applied solvent injection rate. This will cause the concentration and density gradients to remain stable.

The theory just presented is illustrated graphically in FIGS. 2 and 3. FIG. 2 represents a conventional column having adjacent and everywhere equidistant hot and cold walls spaced at approximately 254 microns. As indicated by the arrow, solvent is introduced at the base of the walls, and forced to flow upward. Nevertheless, it can be seen from the graph in FIG. 2 that the density of such a column varies mostly in the top 5 to 10 cm, after which the density varies only slightly. This results in a very small density gradient, which is too small to prevent undesirable mixing. In a system according to the present invention, on the other hand, as depicted in FIG. 3, the hot and cold walls are arranged to diverge from top to bottom. In such an arrangement, the density varies substantially over the entire length of the column. This produces the desired value for the concentration gradient.

A thermal diffusion apparatus such as that just described might be used, for example, to separate calcium isotopes as follows. The top of the column formed by the first and second walls is filled with a solution which is 25% by weight calcium nitrate, and then connected to a large reservoir containing a concentrated solution which is 25% by weight calcium nitrate. After a short start-up period (20 hours), solvent is introduced at the base of the column at an injection rate such that the density of the solution at the bottom of the column is controlled at a value of approximately 1.37 g/ml. This corresponds to a solute concentration of approximately 41%. Control can preferably be maintained by the use of a density meter in the bottom recirculation loop of the column, the output of the density meter being processed by a microcomputer to develop control signals for setting the rate of a solvent injection pump.

Using the apparatus described above, the solvent counterflow rate required to maintain the solute concentration at the bottom of the column at the control value was 0.5 g/hr.

The progress of calcium isotope separation as a function of time experimentally obtained with the device and process disclosed above is plotted in FIG. 4. This experiment was terminated after 44 days when the separation factor for the $^{40}$Ca and $^{48}$Ca pair reached 2.03 and that of the $^{40}$Ca and $^{44}$Ca pair reached 1.44. The separation factor q is defined by:

$$q_i = \left(\frac{w_i}{w_{40}}\right)_B \bigg/ \left(\frac{w_i}{w_{40}}\right)_T$$

where $w_i$ and $w_{40}$ are the mass fractions of the isotopes and the subscripts T and B refer to the top and the bottom of the column, respectively.

The separation factors for the two isotopic pairs are described as functions of time by the following empirical equations:

$$\ln q_{48} = 0.71(1 - e^{-t/12.4})$$

$$\ln q_{44} = 0.355(1 - e^{-t/10.85})$$

where t is the time in days. The empirical relaxation times imply an initial transport rate of 500 micrograms per day for $^{48}$Ca and 6 milligrams per day for $^{44}$Ca.

These results show that the performance of the new, tapered column is clearly superior to that obtainable with prior art columns.

A novel method and apparatus for isotopic separation using a counterflow thermal diffusion process have been presented above. The specific embodiment of the apparatus disclosed above, and the specific parameters of the method also disclosed above, are presented merely as illustrations to facilitate explanation of the invention and should not be regarded as limitative. It will be readily apparent to one of ordinary skill in the art that the specific details disclosed herein may be varied considerably without departing from the scope of the present invention. Therefore, the present invention should not be regarded as limited to the specific embodiment disclosed herein, but should instead be regarded as fully commensurate in scope with the following claims.

What is claimed is:

1. A thermal diffusion apparatus for separating isotopes suspended in a solution comprising:
   a vertical first wall having a first temperature;
   a vertical second wall disposed substantially adjacent said first wall, and arranged to diverge from said first wall toward a bottom of said first and second walls, thereby defining a slit between said first and second walls which tapers bottom to top, said second wall having a second temperature substantially different from said first temperature;
   means, in fluid communication with said slit, for introducing said solution into said slit; and
   means, in fluid communication with said slit, for maintaining a flow of solvent from the bottom to the top of said slit.

2. A thermal diffusion apparatus as claimed in claim 1, wherein said first wall comprises an elongate frustum, and wherein said second wall comprises an elongate cylinder disposed coaxially about said elongate frustum so that said slit has the form of an annular column which tapers from bottom to top.

3. A thermal diffusion apparatus as claimed in claim 1, further comprising means in thermal contact with said first wall for maintaining said first wall at said first temperature, and means in thermal contact with said second wall for maintaining said second wall at said second temperature.

4. A thermal diffusion apparatus as claimed in claim 1, wherein said means for maintaining a flow of solvent from the top to the bottom of said slit further comprises a top recirculation loop in fluid communication with the top of said slit for injecting concentrated solution into the top of said slit.

5. A thermal diffusion apparatus as claimed in claim 1, wherein said walls are made of nickel 200.

6. A thermal diffusion apparatus as claimed in claim 1, wherein the spacing of said first and second walls at the top of said slit is about 230 microns, and the spacing of said walls at the bottom of said slit is approximately 280 microns over a column length of about 120 cm.

7. A thermal diffusion apparatus as claimed in claim 1, wherein said walls diverge monotonically toward the bottom of said slit.

8. A thermal diffusion apparatus as claimed in claim 1, wherein said first temperature is about 164° C. and said second temperature is about 15° C.

9. A thermal diffusion apparatus as claimed in claim 1, wherein said solution is an aqueous calcium nitrate solution.

10. A thermal diffusion apparatus as claimed in claim 1, wherein the rate of said solvent flow is less than the product $H_{ss}(1-w_2)$, where $H_{ss}$ is the initial transport coefficient and $w_2$ is the solute concentration.

11. A thermal diffusion apparatus as claimed in claim 1, wherein said means for maintaining a flow of solvent from the top to the bottom of said slit further comprises:
   a top recirculation loop in fluid communication with the top of said slit for injecting concentrated solution into the top of said slit; and
   a bottom recirculation loop in fluid communication with the bottom of said slit for injecting solvent into the bottom of said slit.

12. A thermal diffusion apparatus as claimed in claim 11, wherein said top recirculation loop includes means for extracting solution from the top of said slit, and means for separating said extracted solution into said concentrated solution injected into the top of said slit, and into said solvent injected into the bottom of said slit.

* * * * *